March 4, 1930.  J. DEL R. DE LAND  1,749,068
ORCHARD PROTECTIVE SYSTEM
Filed May 22, 1928  2 Sheets-Sheet 1

Inventor
John Del Rea De Land
Attorney.

March 4, 1930.  J. DEL R. DE LAND  1,749,068
ORCHARD PROTECTIVE SYSTEM
Filed May 22, 1928   2 Sheets-Sheet 2
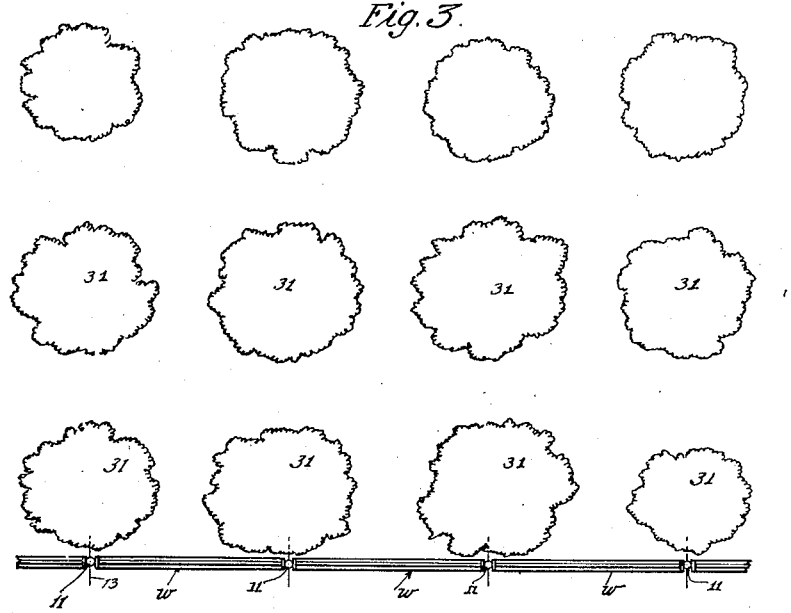
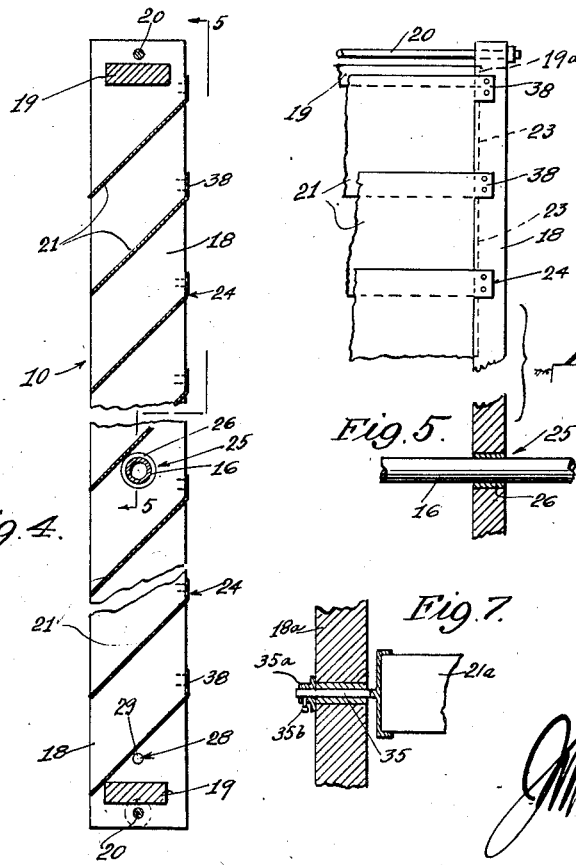
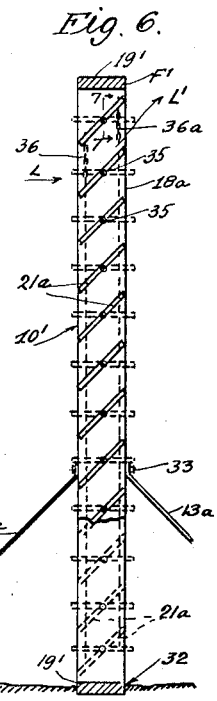
Inventor
John Del Rea DeLand
Attorney.

Patented Mar. 4, 1930

1,749,068

UNITED STATES PATENT OFFICE

JOHN DEL REA DE LAND, OF PICO, CALIFORNIA

ORCHARD PROTECTIVE SYSTEM

Application filed May 22, 1928. Serial No. 279,788.

This invention has to do generally with wind deflecting structures and particularly in regard to their use as protective means for orchards. As will be made apparent later, the type of structure disclosed in the following specification may be considered essentially as a louver wall, so constructed and operable as to be particularly effective for the purpose set forth.

It is well known that high winds often have destructive effects upon orchards, not only in causing direct damage to the tree structures but also in preventing their proper growth. "Wind breaks" commonly employed are in the form of tall trees grown along that side of the orchard from which the prevailing wind blows. Numerous disadvantages arising from the use of such "wind break" trees are well known to those familiar with the art. For instance, an inherent disadvantage of this system is that orchard trees located close to the wind-break trees are deprived of the normal amount of nourishment from the soil due to part being taken up by the protecting trees.

By use of the present invention, suitable wind protective means for an orchard is provided without incurring any deleterious effects on any of the trees thereof. Economy in available ground space is possible in that the protective structure herein described may be located relatively close to the outermost trees of the orchard. An additional advantage in the use of said structure exists in that it serves not only to deflect wind currents but to direct them as well, being adjustable directionally to function in accordance with varying wind conditions. Furthermore, in the event no appreciable obstruction of wind currents is desired, the system may be rendered ineffective by a simple adjustment.

In addition to the above mentioned destructive effects of the wind it is believed by me that the leaves and fruit on the trees are often "burnt" or unduly dried as a result of electrically charged particles carried in the air being deposited on the tree members, or electrical charges being generated on these members due to the friction of the wind thereon. As will later be made apparent, by the use of the present invention the generating or depositing of such electrical charges on the trees is minimized to such an extent as to render their effect negligible.

In the following detailed specification I have described a preferred form of my invention as effecting certain desired results, but it is understood that this choice of a particular embodiment for illustrative purposes is not to be considered as limitative on the invention considered in its broader aspects. Throughout the following detailed description reference is made to the accompanying drawings, in which:—

Fig. 3 is a diagrammatic plan view of an embodiment of my invention suitably disposed with reference to an orchard.

Fig. 4 is a vertically contracted section on line 4—4 of Fig. 1, the elements being on a slightly larger scale.

Fig. 5 is a section on line 5—5 of Fig. 4, parts being shown in elevation.

Fig. 6 is a sectional and fragmentary end elevation view showing a variational form of louver wall.

Fig. 7 is a fragmentary section on line 7—7 of Fig. 6.

Figure 1:
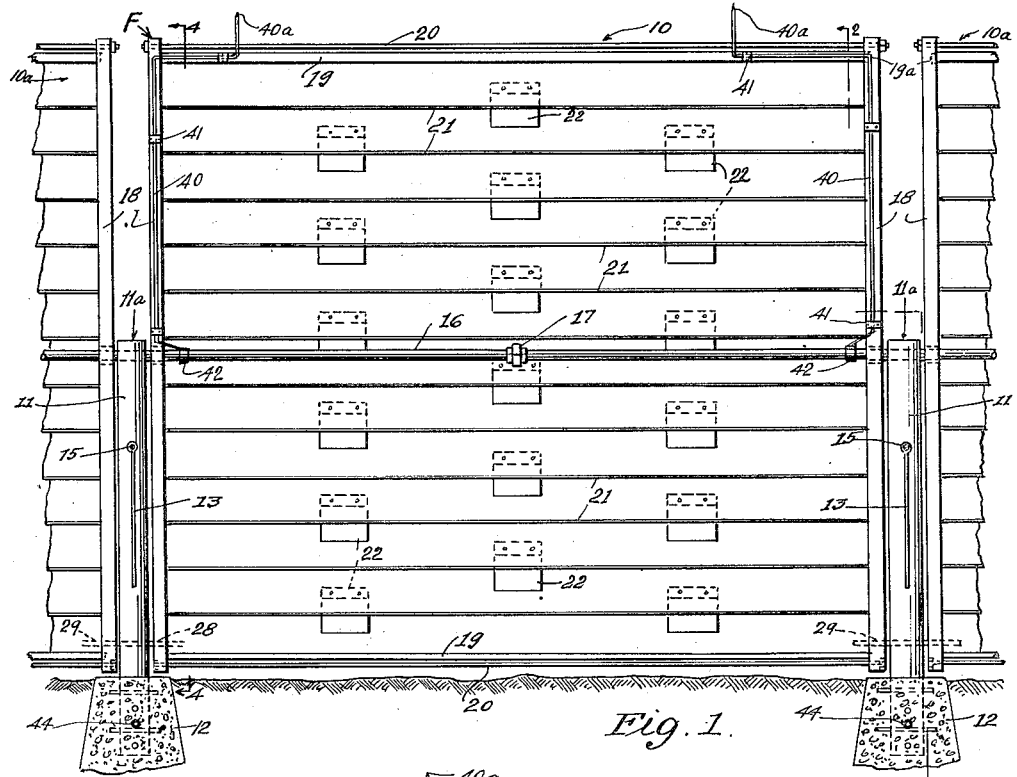
Figure 1 is a side elevation of an embodiment of my adjustable louver wall, including one complete section and fragmentary portions of adjacent similar sections.

As will later appear, by the use of the louver wall herein described, it is possible to deflect air currents from a horizontal or downward path to an upward path, the slope of which is dependent upon the angle at which the louver panels are inclined. The louver wall preferably embodies a series of vertically spaced and parallel louver panels which are inclined upwardly and outwardly from the windward side of the wall, the inclination preferably, though not necessarily, being such that when the wall is vertical the upper edge of a given panel is in substantially the same horizontal plane as the lower edge of the panel next above. The flow of air currents is through the louver openings defined by adjacent louver panels. These panels are supported at their ends and may be intersupported by braces extending between adjacent louver panels at points intermediate their ends. The wall, as a whole, may include a series of comparatively short sections, which sections are placed end to end in number according to the extent of wind-obstructing front desired. The sections may be similar in construction and may be capable of individual adjustment by tilting on a horizontal axis.

In the annexed drawings it is seen that between adjacent wall sections, generally indicated at 10 and 10ª, are supports or posts 11, preferably made of pipe and imbedded at their bases in concrete footings as at 12. Each support may be braced laterally by means of guy rods 13 which are imbedded at their lower ends in concrete 14 and are connected at their upper ends with the ends of bolts 15 which extend through the post. Additional rigidity of the bracing structures for supports 11 is effected by the use of rods or pipes 44 imbedded in the ground and having their central and end portions held securely in concrete footings 12 and 14 respectively. Near the upper end of each post at 11ª, is provided a hole or slot which extends horizontally through the post and within which a shaft 16 is supported. Shaft 16 may be sectional in character, as, for example, pipe sections disconnectably joined by union 17 at points intermediate supports 11.

The louver wall, generally indicated at W and made of sections 10, 10ª, may be of any suitable height and is mounted sectionally on shaft 16 in a manner that will later be explained. The framework F of a typical section 10 embodies normally vertical end members 18, horizontal spacing rails 19 having their ends recessed into the end members as at 19ª, and tie rods 20 connecting the end members. Extending horizontally between members 18 and joined at their ends thereto are inclined louver panels 21. Braces or spacing blocks 22 extend between and connect adjacent louver panels. Although the panels may be of any suitable material, preferably they are of sheet metal. As indicated in Figs. 4 and 5, the ends of louver panels 21 are fitted into grooves 23 in end members 18, and offset extensions 38 are bent over and fixed to the outer sides of the supports as at 24.

The end members are drilled preferably midway between their upper and lower extremities to permit the projection of shaft 16 through and beyond said members as at 25. Collars 26 are inserted within members 12 to serve as bearings for the shaft. Thus it is seen that the wall section is swung clear of the ground on shaft 16 and its weight transferred through frame members 18 to the shaft and thence to supports 11. The supports and members 18 are provided near their lower ends with horizontally extending holes 27 and 28, respectively, to receive removable bar 29 for the purpose of holding the wall section releasably in an upright position. Thus when the holes indicated are brought into alignment by pivotal adjustment of the wall about shaft 16, and at which time the wall is substantially erect, bar 29 may be readily inserted. The bar preferably extends a short distance beyond the end members. When it is desired to hold the wall in an inclined position, as indicated by the dotted lines at B in Fig. 2, rod 29 is removed, the wall tilted to the desired position, the rod reinserted and anchor rods 30, connected at their upper ends with tie rods 20 and at their lower ends with bar 29, are put into place as shown. Any convenient means of connection, such as hooks at the ends of anchor rods 30, may be used for releasably connecting said rods with tie rods 20 and bar 29. It is evident that the wall is balanced about shaft 16 and is substantially in equilibrium in any adjusted position so that tension in rods 20 is brought about through wind forces only.

It has been found desirable to include in the wall structure grounding conductors 40 of which there may be any desired number and which project upwardly above the wall as at 40ª, being supported thereon as at 41. These rods or conductors are preferably "grounded" in any suitable manner. In the drawings they are shown to be joined to metallic collars 42 rotatably mounted on shaft 16. Thus electrical charges carried in the air are collected by rods 40 and discharged to the ground through the collars, shafts 16 and metal supports 11.

In Fig. 3 the wall structure is indicated as being suitably disposed adjacent to an orchard comprised of trees 31. It will be observed that the lengths of the individual wall sections are such that supports 11 are located substantially in line with tree rows normal to the louver wall. This is done as a matter of convenience in that when it is desired to cultivate the soil between the outermost trees, the louver wall may be tilted to a horizontal position and thereby afford a free passageway between supports 11. My invention, however, is not restricted to the above specific arrangement but broadly contemplates the use of sections mounted in any suitable manner and of any convenient length and form. It is considered desirable to locate the wall W immediately adjacent to the outermost trees, even though it should be necessary to top the latter to permit the louver wall to be tilted horizontally.

Figure 2:
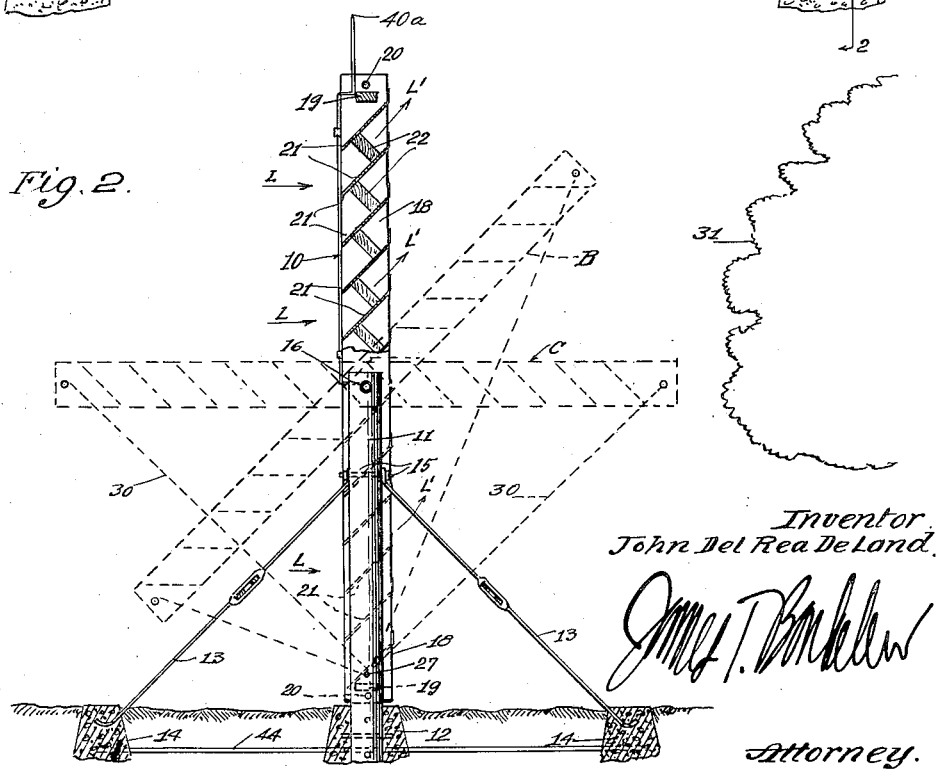
Fig. 2 is a section on the broken line 2—2 of Fig. 1, certain parts being shown in end elevation.

During periods of high winds, wall 10 is fixed in a substantially upright position as indicated in full lines in Fig. 2. Thus wind currents coming in the direction of arrows L are deflected upward and away from trees 31 in the direction of arrows L', after the passage of the currents between louver panels 21. It is evident that by deflecting the wind from the trees, the generation of electricity thereon by wind friction is prevented.

The primary purpose of tilting the louver wall is to provide means for altering the positions of the panels. For instance, at times of very little wind it might be desirable to have the louver panels inclined so as to offer the least possible resistance to the passage of wind currents toward the trees. By inclining the panels to a horizontal position this purpose would obviously be accomplished. Thus it is indicated in Fig. 2 that by tilting the louver wall to a position B, the panels are held in a horizontal position and the air currents allowed to continue in their path L.

Although I have provided means for tiltably adjusting an entire louver wall section, it is, as hereinabove stated, a primary purpose of said means to provide a method for altering the positions of the louver panels. It is possible to obtain substantially the same effects as described in the preceding paragraph by means of a louver wall structure in which the wall proper is stationary, but for a reason to be stated later and for the sake of securing certain of the previously mentioned advantages, I prefer the tiltable type of louver wall hereinabove described. However, for purposes of clearly setting forth my invention I will now describe a variational type of wall, but one which is broadly contemplated by the present invention.

This variational type of louver wall is generally shown in Fig. 6. It is seen that the wall 10' is supported on the ground at 32 and embodies a frame F' having two vertical end members 18ª. Horizontal frame members 19' may be provided similar to those used in my preferred type of wall structure and corresponding to rails 19 and tie rods 20 therein. The wall is held stationarily in a vertical position by means of guy rods 13ª having their upper ends joined to end members 18ª at 33 and having their lower ends embedded in the ground at 34. Shafts 35 extend horizontally and centrally from the ends of louver panels 21ª, said shafts being journaled in end members 18ª as shown in Fig. 7. Thus it is seen that the panels are mounted for oscillatory movement. I have conventionally illustrated chains 36 and 36ª interconnecting panels 21ª at opposite sides of their shafts, the illustrated chains being shown as typical means for simultaneously adjusting all the panels to the position desired and in accordance with a single motion of one chain. Any suitable releasable means may be employed for holding the panels is adjusted position. For instance, one or more of the panel shafts 35 may extend into a support-carried boss 35ª, set screw 35ᵇ being adapted to be threaded through the boss into and out of engagement with the shaft to hold the panel against movement or to release it for movement, respectively.

It is obvious that the two types of louver walls indicated in Figs. 2 and 6 are practically equivalent in their performance when disposed in the positions indicated by the solid lines, and that the same is true when the louver panels in Fig. 6 are tilted horizontally to correspond to position B of Fig. 2. However, by the use of my preferred type of louver wall I gain an additional advantage over that of Fig. 6 in that the wall 10 may be tilted to a true horizontal position as indicated at C and thereby remove practically all obstruction to the flow of air currents.

It will be understood the drawings and description are to be considered merely as illustrative of and not restrictive on the broader claims appended hereto, for various changes in design, structure and arrangement may be made without departing from the spirit and scope of said claims.

I claim:

1. An orchard protective wind-break structure embodying a normally vertical louver wall adapted to be erected at the windward side of the orchard and to deflect wind currents upward and above the orchard, the height of said wall being substantially that of the orchard trees.

2. An orchard protective wind break structure adapted to be erected at the windward side of an orchard and embodying a tiltable louver wall for deflecting and directing wind upward and above the orchard.

3. In an orchard protective wind break structure, a supporting structure, a normally vertical louver wall pivotally mounted intermediate its top and bottom on said structure and inclinable toward a horizontal position, said wall being adapted to direct wind currents upward and above the orchard.

4. In an orchard protective wind break structure, a supporting structure, a normally vertical louver wall centrally and pivotally mounted on said structure and inclinable toward a horizontal position.

5. In a wind deflecting structure, a louver panel, means for inclining the louver panel toward and away from a substantially horizontal position, and means for holding it in adjusted position of inclination.

6. In a wind deflecting structure, a series of spaced posts supporting a continuous shaft, a plurality of wind deflecting louver walls mounted singularly and longitudinally between adjacent posts and tiltable about said shaft.

7. In a wind deflecting structure, a louver wall containing a series of vertically spaced and intersupported louver panels joined at their ends with normally vertical frame members, tie rods interconnecting said members, a horizontal shaft about which the wall is tiltable and which extends longitudinally within the wall and centrally through said frame members, support structures separately adjacent to said members for supporting the shaft, and anchor means for holding the wall in adjusted position.

In witness that I claim the foregoing I have hereunto subscribed my name this 25 day of April, 1928.

JOHN DEL REA DE LAND.